United States Patent

Battie et al.

[11] Patent Number: 6,070,836
[45] Date of Patent: Jun. 6, 2000

[54] LINE HOLDER WITH AN AREA FOR RECEIVING A THREADED BOLT FROM EITHER SIDE

[75] Inventors: Emmanuel Battie; Philippe Wandels, both of Grenoble, France

[73] Assignee: A. Raymond & Cie, France

[21] Appl. No.: 09/242,758

[22] PCT Filed: Aug. 2, 1997

[86] PCT No.: PCT/EP97/04218

§ 371 Date: Feb. 19, 1999

§ 102(e) Date: Feb. 19, 1999

[87] PCT Pub. No.: WO98/07996

PCT Pub. Date: Feb. 26, 1998

[30] Foreign Application Priority Data

Aug. 24, 1996 [DE] Germany .......................... 196 34 309

[51] Int. Cl.[7] ...................................................... F16L 3/22
[52] U.S. Cl. .......................... 248/68.1; 248/71; 248/74.3; 411/437; 411/433
[58] Field of Search ................................. 248/68.1, 67.7, 248/65, 74.3, 74.2, 73, 74.5, 71; 411/525, 526, 437, 433

[56] References Cited

U.S. PATENT DOCUMENTS

| | | | |
|---|---|---|---|
| 4,867,400 | 9/1989 | Reindl | 248/68.1 |
| 4,899,964 | 2/1990 | Sick | 248/68.1 |
| 5,033,701 | 7/1991 | Kraus | 248/68.1 |
| 5,154,376 | 10/1992 | Baum et al. | 248/74.3 |
| 5,302,070 | 4/1994 | Kamayama et al. | 411/437 |
| 5,460,342 | 10/1995 | Dore et al. | 248/74.2 |
| 5,598,994 | 2/1997 | Olewinski et al. | 248/73 |
| 5,660,513 | 8/1997 | Shibanushi | 411/433 |
| 5,816,762 | 10/1998 | Miura et al. | 411/433 |

FOREIGN PATENT DOCUMENTS

| | | |
|---|---|---|
| 628 737 | 12/1994 | European Pat. Off. . |
| 741 251 | 11/1996 | European Pat. Off. . |
| 912009 | 7/1946 | France ................ 411/433 |

*Primary Examiner*—Ramon O. Ramirez
*Assistant Examiner*—Kimberly Wood
*Attorney, Agent, or Firm*—Gifford, Krass, Groh, Sprinkle, Anderson & Citkowski, P.C.

[57] ABSTRACT

A conduit holder having a receptacle portion adapted to be mounted to a threaded bolt in one of two opposed positions. The receptacle area has a pair of spring tongues positioned between two pair of support lands. The bolts is inserted through one of a pair of opposed funnel shaped openings to engage a first pair of support lands with the threads of the bolt. The bolt deflects the spring tongues against the other pair of support lands and the top of the bolt is received in the opposite funnel shaped opening.

4 Claims, 3 Drawing Sheets

LINE HOLDER WITH AN AREA FOR RECEIVING A THREADED BOLT FROM EITHER SIDE

The invention pertains to a conduit holder with one or more holding areas and a receptacle area for two-sided engagement on a threaded bolt according to the preamble of claim 1. This conduit holder serves for fastening of liquid conduits, pipes or other long extended components onto sheet metal, preferably onto body floors of automobiles. It offers the advantage that they can be mounted on threaded bolts from both sides, so that the holding areas, depending upon the demands of the customer, either are hidden by the sheet metal of the body of the car or are open downward for filling.

A conduit holder of this type known from EP 0,628,737 A1 is equipped with obliquely opposing engagement parts (support lands) between two funnel openings on both sides, as well as longitudinal ribs in the middle section of the opening. When the receptacle area is attached, the threaded bolt passes through a collar of engagement parts and into the area of the longitudinal ribs, where it is guided laterally, while the collar of engagement parts rests on the flanks of the threads of the threaded bolt.

It is here considered a disadvantage that the threaded bolt is engaged and supported only by the engagement parts adjoining the funnel opening, while the opposing engagement parts do not participate in the support but are instead oriented against the threading of the bolt and are therefore in the way of the penetration of the threaded bolt. In order to achieve the necessary holding power, the design of the engagement parts must be relatively inflexible, whereas the assembly power must then be increased accordingly.

The objective of the invention is to configure the aforesaid conduit holder in such a way that the threaded bolt can be dubbed completely into the receptacle area on both sides and the holding power of the engagement parts is simultaneously increased thereby without the assembly or disassembly of the conduit holder being rendered more difficult.

This objective is realized in keeping with the present invention in that, between the obliquely opposed support lands, two oppositely situated spring tongues are provided, which protrude transversely into the receptacle space and form a small fissure in the middle with their reinforced ends, and which have such a separation from the cited support lands that, when the threaded bolt is inserted, their reinforced ends are pivoted in front of the opposing support lands and thus also rest against the threading of the threaded bolt.

It is thus realized that the support lands, which are opposingly oriented in the state of the art, are pressed away by the spring tongues when the threaded bolt enters and the tip of the threaded bolt can force its way into the opening of the opposingly oriented funnel, so that the receptacle area of the conduit holder is oriented on the axis of the threaded bolt. Moreover, the spring tongues resting on the flank of the threading of the threaded bolt are propped toward the wall by the support beams of the support lands, so that the additionally engaging spring tongues are pressed firmly on the flanks of the threading and the holding power in the receptacle area is significantly reinforced.

Additional characteristics of the invention are revealed in the subordinate claims and are explained in greater detail below with references to an embodiment example shown in the appended drawings. Depicted are:

FIG. 1, conduit holder for four conduits in side view;

FIG. 2, the conduit holder in top view;

FIG. 3, a partial section through the receptacle area on the line III—III in FIG. 2;

FIG. 4, a conduit holder with holding areas facing away from the sheet metal of the body of the car prior to its pressing onto the threaded bolt;

FIG. 5, the same conduit holder when the threaded bolt penetrates the receptacle area;

FIG. 6, the same conduit holder following its pressing onto the threaded bolt;

FIG. 7, a conduit holder pressed onto a suspended threaded bolt, with the openings of the holding areas oriented toward the carrier plate, and FIG. 8, the same conduit holder pressed onto a suspended threaded bolt, with the openings of the holding areas oriented away from the carrier plate.

The conduit holder depicted in the figures is used to fasten conduits or pipes on carrier plates using so-called threaded bolts. In particular, these conduit holders should be used for fastening fuel lines on the bottom of the body of automobiles.

To this end, the conduit holder made of hard elastic plastic is provided with holding areas (1) and (2), as well as a receptacle area (3) for two-sided pressing onto the threaded bolt (10), which is welded or otherwise affixed in a known manner to a carrier plate (17). This receptacle area (3) is formed by two side walls (4) and (5), which are integrated between two adjoining holding areas (1) and (2) in the conduit holder and joined together by a base plate (6) and a cover plate (7). Both plates (6) and (7) are provided with funnel-shaped openings (8) and (9) tapering to the receptacle area (3), which form a passageway opening transverse to the conduit axis.

On the side walls (4) and (5) between the two funnel openings (8) and (9), inwardly protruding, opposingly oriented, resilient support lands (11) and (12) are formed, which are supported on the threading of the inserted threaded bolt (10). To this end, the support lands (11) and (12) have massive support beams (13) on their ends, which are provided with small catch projections (14) protruding to the middle.

In the middle between the upper support lands (11) and the lower support lands (12) there are two spring tongues (15), which are formed on the opposing side walls (4) and (5), protrude transversely into the receptacle area (3) and with their reinforced ends (16) form a small fissure "s" in the middle. These spring tongues (15) are so spaced in relation to the support lands (11) and (12) that, when the threaded bolt (10) is inserted, their reinforced ends (16) are pivoted in front of the respective support beams (13) of the opposing support lands (11) or (12).

The interaction according to the invention of the support lands (11) and (12) and the spring tongues (15) when the conduit holder is mounted or pressed onto the threaded bolt (10) is illustrated in the assembly sequence in FIGS. 4–6.

After the entry of the threaded bolt (10) into the funnel opening (9), first the entry-side support lands (12) are forced apart. Then the reinforced ends (16) of the spring tongues (16) are forced up (FIG. 5) and pivoted in front of the catch projections (14) of the support beams (13) of the opposingly oriented support lands (11), whereupon the latter give way to rest on the side walls (4) and (5). This causes the reinforced ends (16) of the spring tongues (15) to be wedged between the beams (13) and the threaded bolt (10) and therefore to be pressed firmly against the threading of the threaded bolt (10) (FIG. 6).

As soon as the threaded bolt (10) has penetrated the opening of the opposing funnel opening (8), the assembly operation is complete. To release the conduit holder with installed conduits, the possibility exists of releasing the spring tongues (15) from the threading using a screwdriver 26 at the side and then withdrawing the receptacle area (3) from the threaded bolt (10).

It goes without saying that the receptacle area (3) can be assembled in both the position shown in FIG. 8 and the reversed position shown in FIG. 7, i.e., with the openings of the holding areas (1) and (2) oriented toward the carrier plate (17).

In the first cited instance, the conduits can be subsequently pressed into the holder. In the last cited instance on the other hand, the conduits must first be installed before the holder is pressed onto the threaded bolt.

Of course, the receptacle area (3) designed according to the invention can also be used with equally good fastening effect in connection with other holder elements, which are normally mounted on threaded bolts.

What is claimed is:

1. A conduit holder having at least one holding portion for receiving at least one conduit and a receptacle portion for receiving a threaded bolt, said receptacle portion being defined by two opposed side walls, said receptacle portion having a pair of funnel shaped openings, each of said pair of openings tapering inwardly into said receptacle portion, forming a passageway extending on an insertion axis which extends transversely to a receiving axis of said at least one holding portion, said receptacle portion having two pairs of support lands extending from said side walls, each of said two pairs of support lands having a resilient end portion, each of said pairs of support lands positioned to receive said bolt therebetween, said conduit holder comprising a pair of opposed spring tongues disposed between said pairs of support lands, said tongues extending into said receptacle portions transversely to said insertion axis, said tongues having an end portion spaced apart a predetermined distance to form a gap wherein said end portions of said tongues are displaced to abut and bend said respective ones of one pair of said two pairs of support lands toward respective side wall when said bolt is inserted into one of said funnel shaped openings.

2. The conduit holder of claim 1, wherein each end portion of said two pairs of support lands comprise a catch projection extending toward said insertion axis.

3. The conduit holder of claim 1, wherein said one pair of support lands are deformed by abutment said spring tongues to contact said side walls when said bolt is inserted into said receptacle portion of said conduit holder.

4. The conduit holder of claim 1, wherein said funnel shaped openings are separated a predetermined distance to permit said bolt to pass through one of said pair of openings and a tip of said bolt to extend in another of said pair of openings.

* * * * *

UNITED STATES PATENT AND TRADEMARK OFFICE
CERTIFICATE OF CORRECTION

PATENT NO. : 6,070,836
DATED : June 6, 2000
INVENTOR(S) : Emmanuel Battle et al.

It is certified that error appears in the above-identified patent and that said Letters Patent is hereby corrected as shown below:

<u>Columns 1-4,</u>
Specification should be reprinted as shown on the attached pages.

Signed and Sealed this

Twentieth Day of July, 2004

JON W. DUDAS
*Acting Director of the United States Patent and Trademark Office*

LINE HOLDER WITH AN AREA FOR RECEIVING A THREADED BOLT FROM EITHER SIDE

BACKGROUND OF THE INVENTION

The invention pertains to a conduit holder with one or more holding areas and a receptacle area for two-sided engagement on a threaded bolt. The conduit holder serves for fastening of conduits, pipes or other long extended components onto sheet metal, preferably onto automobile body. The conduit holder can be mounted on threaded bolts from either of two sides, so that the holding areas, depending upon the demands of the customer, are either covered by the sheet metal of the body of the car or open downwardly for receiving the conduits.

A conduit holder of this type known as disclosed in EP 0,628,737 A1. This conduit holder is provided with obliquely opposing engagement parts (support lands) extending between two funnel shaped openings, as well as longitudinal ribs in the middle section of the opening. When the conduit holder is attached, a threaded bolt passes through a collar of engagement parts and into the area of the longitudinal ribs, where it is guided laterally. The collar of the engagement parts rests on the threads of the threaded bolt.

It is a disadvantage of this type of holder that the threaded bolt is engaged and supported only by the engagement parts adjoining the funnel shaped opening. The opposing engagement parts do not participate in the support but are instead oriented against the threading of the bolt and are therefore in the way of the penetration of the threaded bolt. In order to achieve the necessary holding power, the design of the engagement parts must be relatively inflexible, thus, requiring a great amount of force to assembly the parts.

The objective of the invention is to configure the aforesaid conduit holder in such a way that the threaded bolt can be inserted completely into the receptacle area from either side and to increase the holding power of the engagement parts without making the assembly or disassembly of the conduit holder more difficult.

In accordance with the invention, this objective is accomplished by providing two oppositely situated spring tongues which protrude transversely into the receptacle space and form a small gap therebetween. Each tongue has a reinforced end which is formed so that when the threaded bolt is inserted, the reinforced ends are pivoted to rest against the threads of the threaded bolt.

It is thus realized that the support lands, on the opposite side of the receptacle area are pushed away by the spring tongues when the threaded bolt enters to permit the tip of the threaded bolt to force its way into the opening of the oppositely oriented funnel. Thus, the receptacle area of the conduit holder is oriented on the axis of the threaded bolt. Moreover, the spring tongues rest on the sides of the threads of the threaded bolt and are propped away from the wall by the support portions of the support lands, so that the engaging spring tongues are pressed firmly against the threading and to significantly increase the holding power.

BRIEF DESCRIPTION OF THE DRAWINGS

Additional characteristics of the invention are shown in greater detail below with references to a preferred embodiment as shown in the appended drawings. Depicted are.

DETAILED DESCRIPTION OF THE PREFERRED EMBODIMENT

Figure 1:
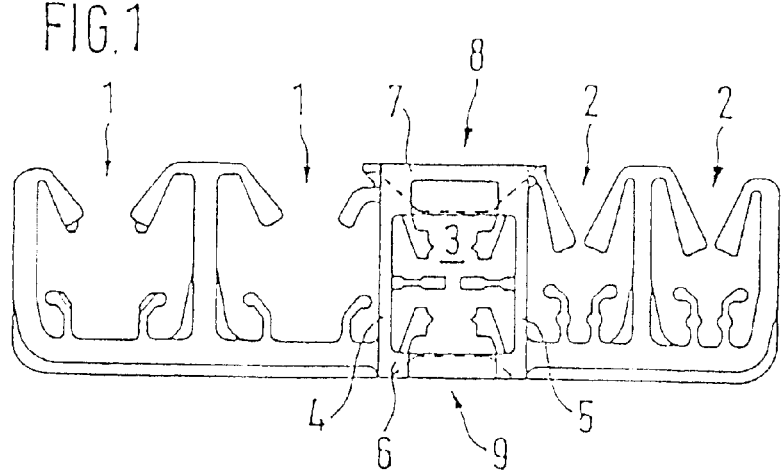
FIG. 1, is a side view a conduit holder for four conduits.
Figure 2:
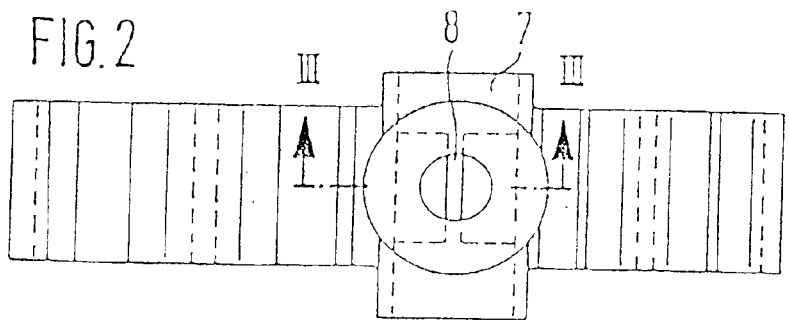
FIG. 2, is a top view of the conduit holder.

As shown in FIGS. 1 and 2, the conduit holder is used to fasten conduits or pipes on carrier plates using threaded bolts. In particular, the conduit holders are particularly suited for use in fastening fuel lines on the underside of the body of automobiles.

Figure 4:
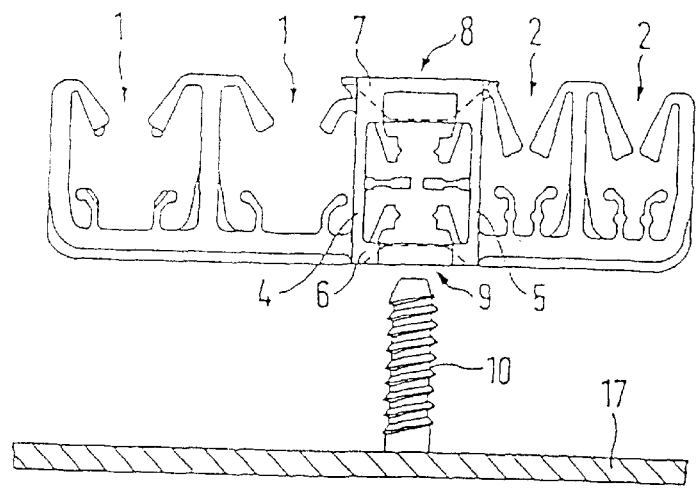
FIG. 4, is a side view of a conduit holder with the holding areas facing away from the sheet metal of the body of the car shown prior to being pressed onto the threaded bolt.
Figure 5:
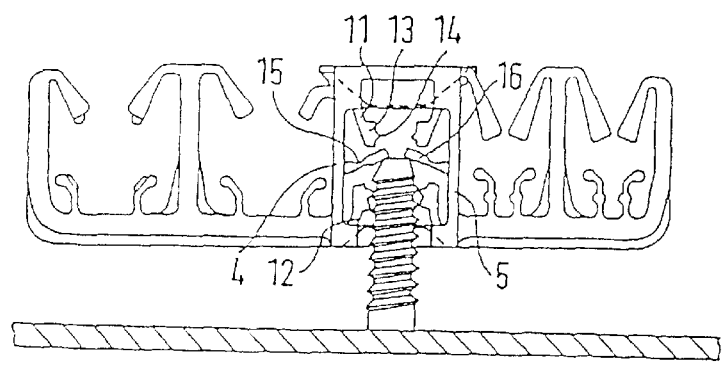
FIG. 5, is a side view of the same conduit holder shown as the threaded bolt penetrates the receptacle area.
Figure 6:
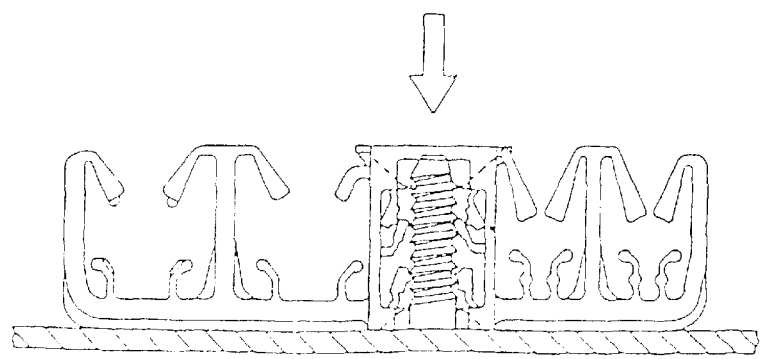
FIG. 6, is a side view of the same conduit holder shown after being pressed onto the threaded bolt.

To this end, the conduit holder is molded of hard elastic plastic and is provided with holding areas (1) and (2), as well as a receptacle area (3) for accepting a threaded bolt (10) from either side. The bolt 10 is welded or otherwise affixed in a known manner to a carrier plate (17) as shown in FIGS. 4–6. The receptacle area (3) is formed by two side walls (4) and (5), which are formed between the two adjoining holding areas (1) and (2) and extend between a base plate (6) and a cover plate (7). Both plates (6) and (7) are provided with funnel-shaped openings (8) and (9) which taper into the receptacle area (3), and form a passageway having an insertion axis extending transversely to the conduit receiving axis.

Figure 3:
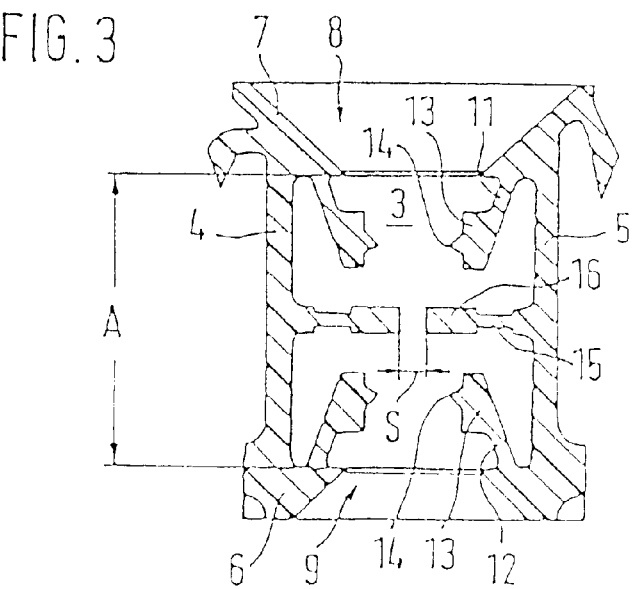
FIG. 3, is a partial sectional view taken through the receptacle area along the line III—III in FIG. 2.

On the side walls (4) and (5) between the two funnel openings (8) and (9), inwardly protruding, opposingly oriented, resilient support lands (11) and (12) are formed, as shown in FIGS. 3 and 5. The lands (11) and (12) are provided for the threading of the inserted threaded bolt (10). To this end, the support lands (11) and (12) have large support portions (13) formed on their ends, which have small catch projections (14) protruding inwardly toward the middle of the receptacle area.

Midway between the upper support lands (11) and the lower support lands (12), there are two spring tongues (15), which are formed on the opposing side walls (4) and (5). The tongues protrude transversely into the receptacle area (3) and have reinforced ends (16) which form a gap and are separated a small distance "s". The spring tongues (15) are so spaced in relation to the support lands (11) and (12) that, when the threaded bolt (10) is inserted, the reinforced ends (16) are pivoted from the respective support portions (13) of the opposing support lands (11) or (12).

In accordance with the invention, the support lands (11) and (12) and the spring tongues (15) interact when the conduit holder is mounted or pressed onto the threaded bolt (10) as illustrated in the assembly sequence in FIGS. 4–6.

After the entry of the threaded bolt (10) into the funnel shaped opening (9), first the entry-side support lands (12) are forced apart. Then the reinforced ends (16) of the spring tongues (15) are forced up (FIG. 5) and pivoted onto the catch projections (14) of the support portions (13) of the opposingly oriented support lands (11). The catch projections (14) then give way to rest on the side walls (4) and (5). This causes the reinforced ends (16) of the spring tongues (15) to be wedged between the support portions (13) and the threaded bolt (10) and therefore to be pressed firmly against the threads of the threaded bolt (10) (FIG. 6).

As soon as the threaded bolt (10) has penetrated the opening of the opposing funnel shaped opening (8), the assembly operation is complete. It is possible to release the conduit holder with installed conduits from the threading using a screwdriver at the side of the bolt to release the spring tongue (15) to permit withdrawal of the receptacle area (3) from the threaded bolt (10).

Figure 7:
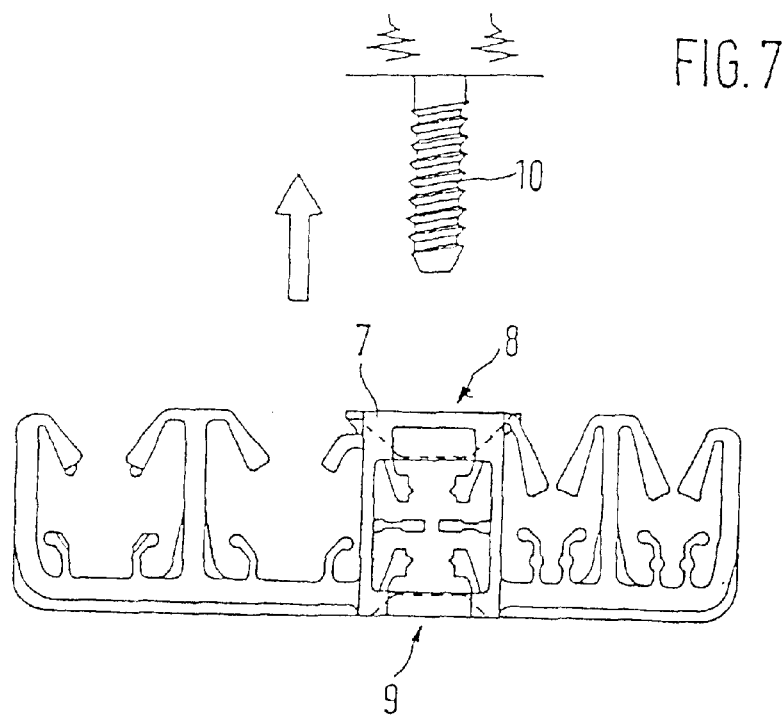
FIG. 7, is a side view of a conduit holder pressed onto a suspended threaded bolt, shown with the openings of the holding areas oriented toward the carrier plate.
Figure 8:
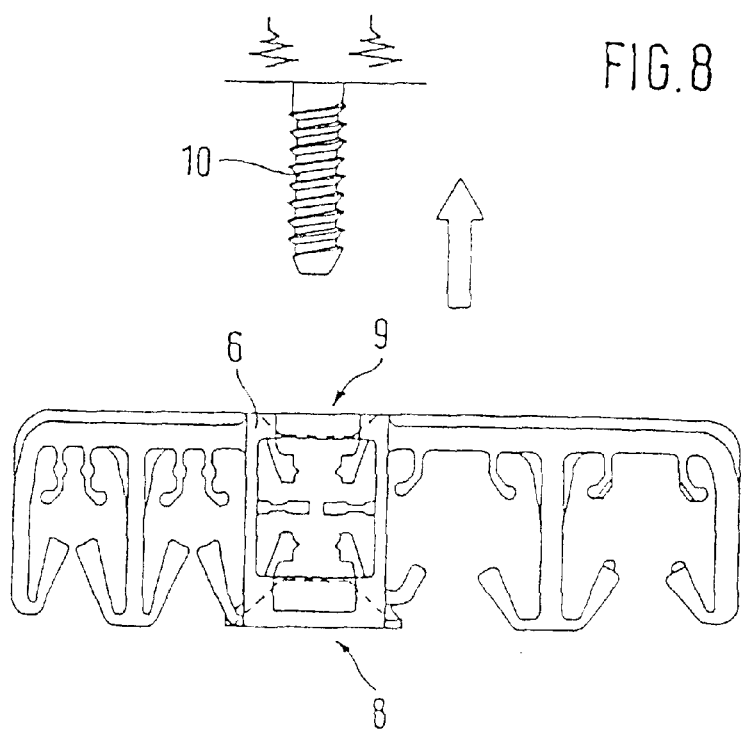
FIG. 8, is a side view of the same conduit holder pressed onto a suspended threaded bolt, shown with the openings of the holding areas oriented away from the carrier plate.

It goes without saying that the receptacle area (3) can be assembled in both the position shown in FIG. 8 and the reversed position shown in FIG. 7. i.e., with the openings of the holding areas (1) and (2) oriented toward the carrier plate (17).

In the first cited instance, the conduits can be pressed into the holder after mounting on the bolt. In the last cited instance on the other hand, the conduits must first be installed before the holder is pressed onto the threaded bolt.

Of course, the receptacle area (3) designed according to the invention can also be used with other holder elements, which are normally mounted on threaded bolts with equally good results.

What is claimed is:

1. A conduit holder having at least one holding portion for receiving at least one conduit and a receptacle portion for receiving a threaded bolt, said receptacle portion being defined by two opposed side walls, said receptacle portion having a pair of funnel shaped openings, each of said pair of openings tapering inwardly into said receptacle portion, forming a passageway extending on an insertion axis which extends transversely to a receiving axis of said at least one holding portion, said receptacle portion having two pairs of support lands extending from said side walls, each of said two pairs of support lands having a resilient end portion, each of said pairs of support lands positioned to receive said bolt therebetween, said conduit holder comprising a pair of opposed spring tongues disposed between said pairs of support lands, said tongues extending into said receptacle portions transversely to said insertion axis, said tongues having an end portion spaced apart a predetermined distance to form a gap, wherein said end portions of said tongues are displaced to abut and bend said respective ones of one pair of said two pairs of support lands toward said respective side wall when said bolt is inserted into one of said funnel shaped openings.

2. The conduit holder of claim 1, wherein each end portion of said two pairs of support lands comprise a catch projection extending toward said insertion axis.

3. The conduit holder of claim 1, wherein said one pair of support lands are deformed by abutment said spring tongues to contact said side walls when said bolt is inserted into said receptacle portion of said conduit holder.

4. The conduit holder of claim 1, wherein said funnel shaped openings are separated a predetermined distance do permit said bolt to pass through one of said pair of openings and a tip of said bolt do extend in another of said pair of openings.

* * * * *